9786X
N. BASSETT.
Compass Needle.
Patented June 28, 1836.
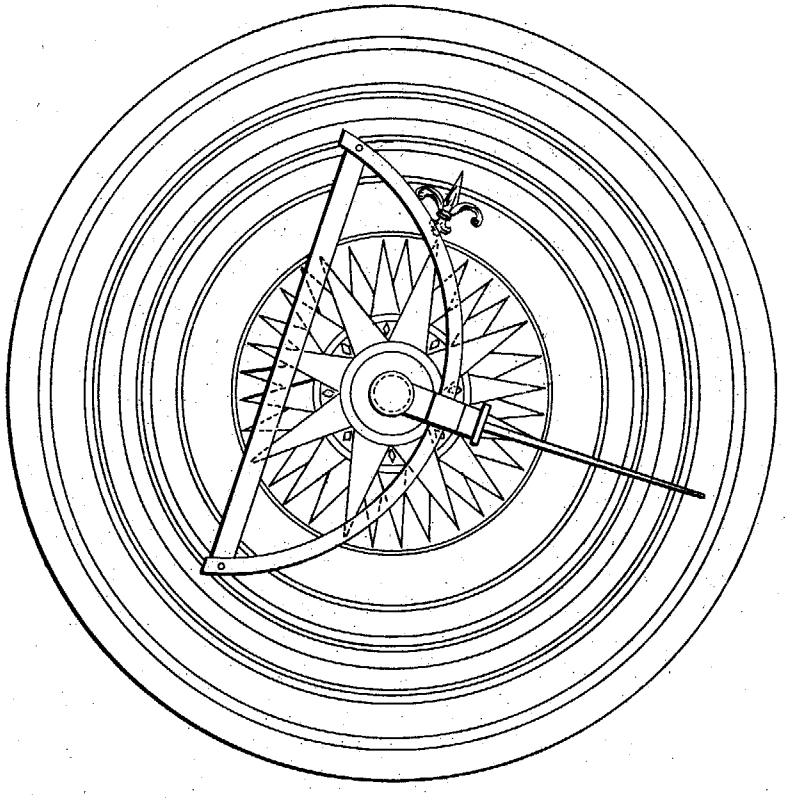
N. PETERS, Photo-Lithographer, Washington, D. C.

Nathan Bassett 9786X

The schedule referred to in these Letters Patent and making part of the same containing a description in the words of the said Nathan Bassett himself of his Improvement in the compass for correcting the errors produced in the direction of the Magnetic needle by local attraction.

Be it known that I Nathan Bassett of the town of Wilmington in the County of New Castle and State of Delaware have made a new and useful improvement in the compass for obtaining a correction for the errors produced in the direction of the Magnetic Needle by local attraction, which is described as follows, reference being had to the annexed drawings of the same making part of this Specification.

This improvement consists in having the needle constructed of one or more pieces of iron or steel and may be in the form of a segment of a circle or of an horse shoe, or in some other shape or form in which the two arms or legs (a) are on the same side of the centre of gravity as seen in the drawing the cap (b) that vibrates upon the centre pivot of the compass being made to reverse produces what I call an East and west compass because the index c which is of brass is inserted into the needle of iron or steel perpendicular to the arms or legs; & when magnetized, points due Magnetic East or West, consequently performs the same in effect as two compasses so arranged as to cut one and the same line and this cannot be done where local attraction exists, let the shape or form of the needle thus capable of reversing be what it may. By this needle I discover first a due magnetic East and West line where no attraction exists secondly I detect what is termed local attraction of the needle and also measure the quantity or number of degrees &c. so attracted, and lastly by the affinity of the attracting substance whether it consists of Pyrites of Iron in Rocks, mountains or Iron bound coasts. I can ascertain the direction in which the positive or negative substance lies agreeably to the following notes in which a comparative view

9786X is taken of the east and west compass with the one governed by the common straight needle, to wit —

A. to B. straight needle course S. 43½ W. — E & W. needle W. 43. S. — S. 45. W. — E & W. reversed, S. 54. W. — It will be perceived that in the above example the difference between one of the legs of E & W needle and the straight needle is 1½ degree, but between the E & W needle when reversed and the straight needle there are 9 degrees, — consequently the substance which attracted the needles lay North Easterly —

What I claim as my invention and what I desire to secure by Letters Patent consists in the before described compass needle for obtaining a correction for the errors produced in the direction of the magnetic needle by local attraction —

Witnesses

William P. Elliot — Nathan Bassett

Clement T. Coote

[illegible] [509 [illegible]]

Received and Recorded [illegible] April 25 [illegible]

[illegible]